Figure 1:
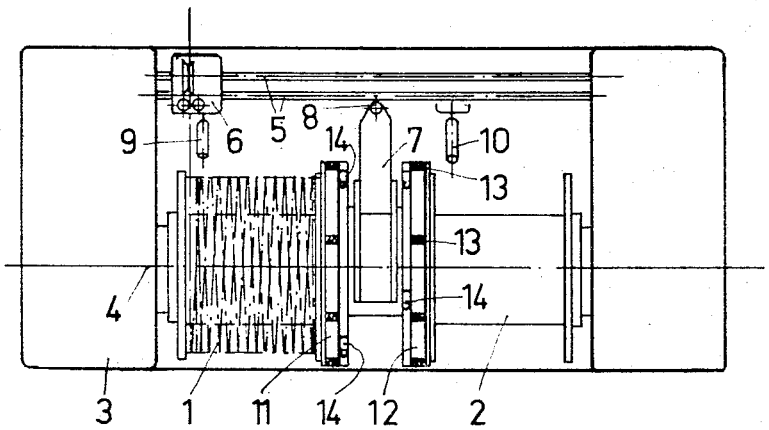

June 6, 1967 P. DIEHL 3,323,735
DOUBLE WINDING APPARATUS
Filed April 23, 1965 4 Sheets-Sheet 1

INVENTOR
Paul Diehl
By
Watson, Cole, Grindle & Watson
Attys.

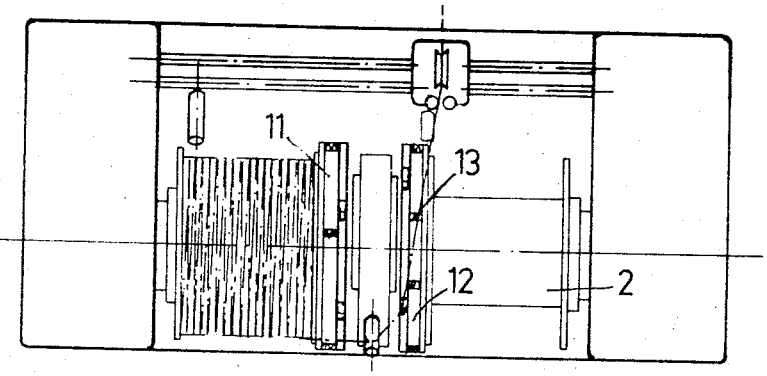
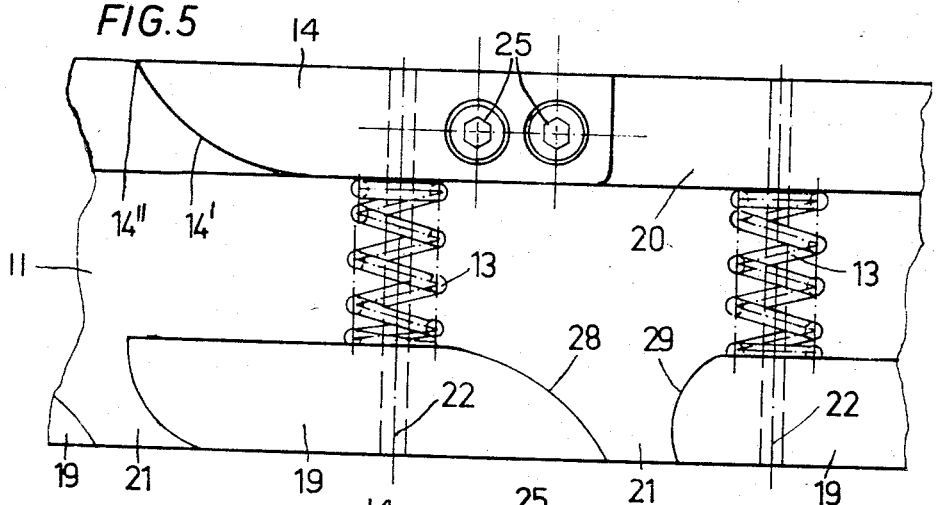
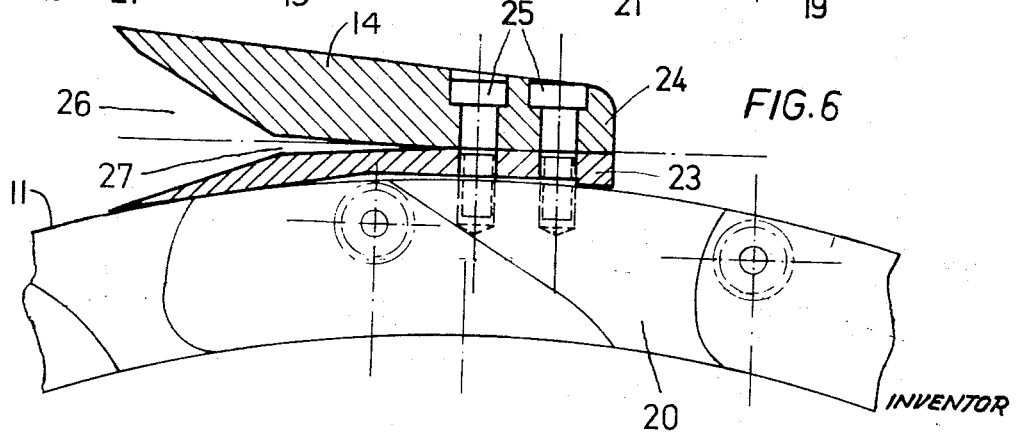

June 6, 1967 P. DIEHL 3,323,735
DOUBLE WINDING APPARATUS

Filed April 23, 1965 4 Sheets-Sheet 3

INVENTOR
Paul Diehl

By
Watson, Cole, Grindle & Watson
Attys.

June 6, 1967  P. DIEHL  3,323,735
DOUBLE WINDING APPARATUS
Filed April 23, 1965  4 Sheets-Sheet 4

INVENTOR
Paul Diehl
By Watson, Cole, Grindle, Watson
Attys.

United States Patent Office 3,323,735
Patented June 6, 1967

3,323,735
DOUBLE WINDING APPARATUS
Paul Diehl, Herborn-Dillkreis, Germany, assignor to Maschinenfabrik Herborn Zweigniederlassung der Berkenhoff & Drebes Aktiengesellschaft
Filed Apr. 23, 1965, Ser. No. 450,372
Claims priority, application Germany, Apr. 27, 1964, M 60,802
9 Claims. (Cl. 242—25)

The invention relates to a double winding apparatus for the continuous winding-on of drawn stock, particularly of wire, of the kind which comprises a laying or setting carriage displaceable parallel to the axes of the reels or bobbins, and plates equipped with so-called catchers or grippers (catching plates) rotating together with the reels and which grip the wire during transfer from one reel to the other and guide it against a stationary blade or cutter. Double winding devices of this nature operate in such manner that after one reel is full, the laying carriage runs across the other empty reel, the wire being gripped by the catching plates and moved against a fixedly mounted blade or cutter which cuts the wire.

With the known forms of apparatus of the kind above mentioned it is necessary that the unattached wire extremities of the first layers of the reel filling be as long as possible in order to allow of subsequent connection of the wire extremities with the starts of other coils. The formation of these long wire extremities raises difficulties because the extremities are acted upon by centrifugal force which is great owing to the relatively high speeds of revolution of the reels or coils. The danger exists therefore that the wire extremities may be flung away and damaged or torn by striking the machine parts of the double winder.

It is a main object of the present invention to provide a double winding apparatus in which the whirling away of the wire extremity and the dangers connected therewith, do not arise.

In an advantageous embodiment of the invention, the stock is clamped fast between the turns of coil springs. The coil springs are advantageously mounted in such manner that the pitch of the turns is approximately parallel to the direction of the stock. If, owing to entrainment by the catcher or gripper, the stock is laid over the periphery of the catching plate, it becomes jammed automatically between the turns of the coil springs. These hold fast the extremity of the stock and thus prevent the stock from being lifted off the catching plate by centrifugal force. The turns of the coil springs preferably have a small spacing from each other. The turns are pushed apart after the insertion of the stock. After the stock has progressed beyond the median plane of the springs, the turns come close again to each other in the area lying above the median plane.

The apparatus may also include for each reel a guide roller supported by said carriage for swinging movement towards and away from the reel appropriate thereto, said rollers being operable to tension stock passing from the carriage to the reels, and a swivelling arm located between the reels and supporting at least one recuperator roller movable by said arm between an idle position thereof at which it is engageable with stock tensioned between said guide rollers and an operative position at which the stock is moved thereby to a position in the region of engagement of the stock by a catching device.

Figure 7:
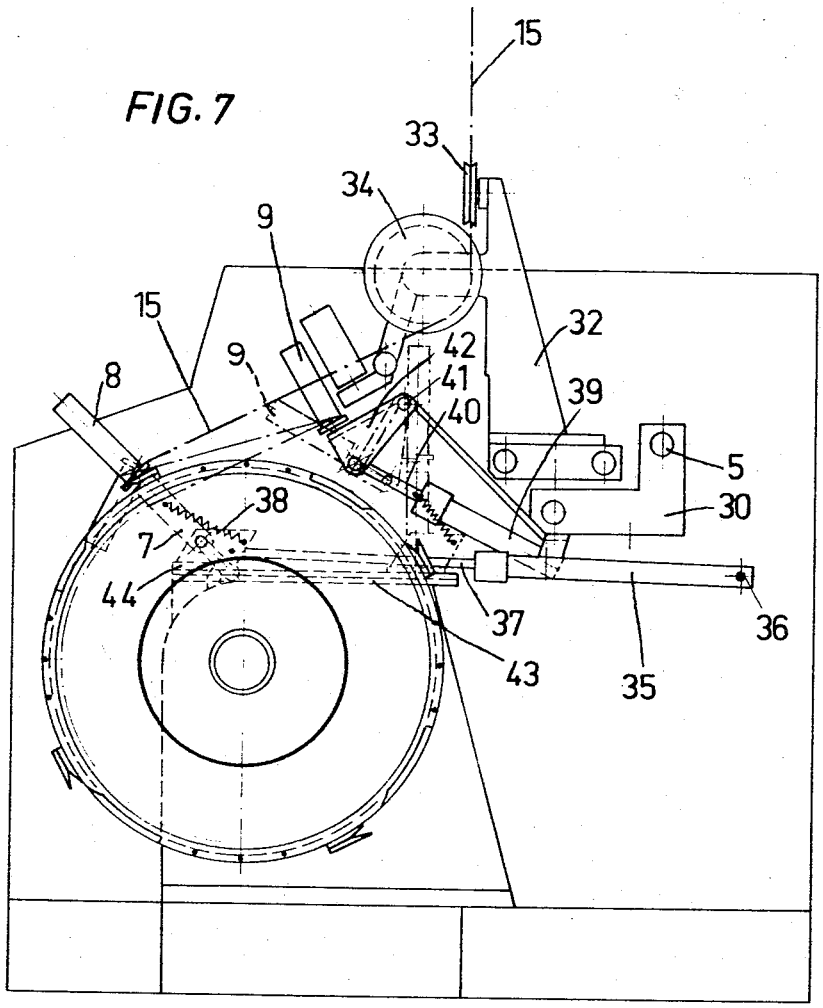
Figure 8:
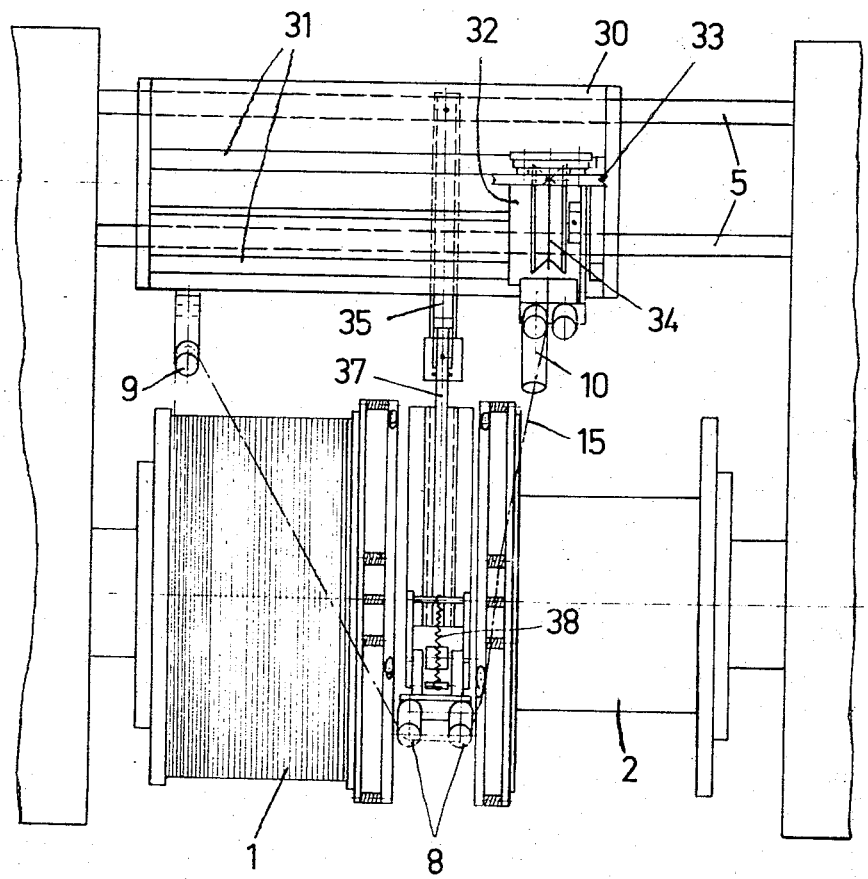

In order that the invention may be clearly understood one embodiment thereof will now be described, by way of example, with reference to the accompanying drawings, in which:

FIGS. 1 to 4 are plan views showing different positions during the deflection of a wire from a full to an empty reel, FIG. 5 is a plan of a part of a winding apparatus and illustrates the periphery of a catching plate and clamping devices, FIG. 6 is a side view of a part of a catching plate with a catcher or gripper associated therewith, FIG. 7 is a side view of the winding apparatus with guide and recuperator rollers, and FIG. 8 is a plan of FIG. 7.

Referring to FIGS. 1 to 4, the winding apparatus includes two reels or bobbins 1 and 2, which are mounted in a machine frame 3 and rotate about a common axis 4. Parallel to the axis 4 of the reel is a guide system 5 including a setting carriage 6 which is displaceable parallel to the axis 4. Between the reels 1 and 2 there is situated a swivelling arm 7, which on its outer extremity carries a recuperator roller 8. Swivellable guide rollers 9 and 10 are also situated on the machine frame; their swivelling system is not illustrated.

A catching plate 11 is mounted on the right-hand side of the reel 1, and another catching plate 12 is mounted on the left-hand side of the reel 2. The catching plates 11 and 12 are mounted symmetrically with respect to each other. Cylindrical coil springs 13 are mounted on the periphery of the catching plates 11 and 12 and the pitch of the turns of the spring is approximately parallel to the direction of the wire passing on to the reel on to which the wire is being wound, see FIGS. 4 and 8. The periphery of each catching plate is also provided with catchers or grippers 14.

Figure 2:
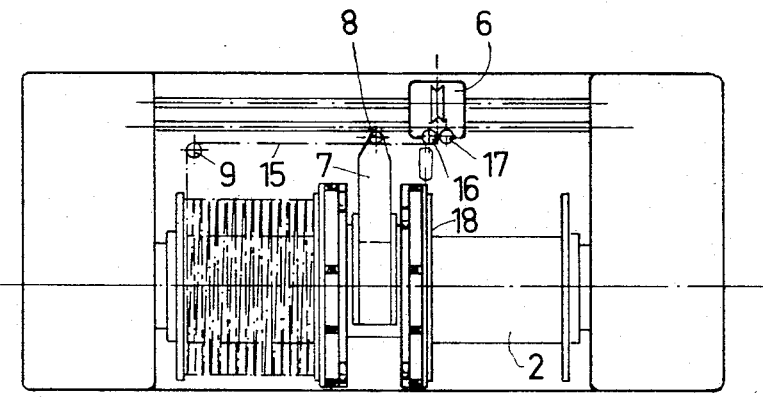

The winding apparatus operates as follows:

When the left-hand reel 1 has been filled, the guide roller 9 moves upwards, that is from the position shown in FIG. 1 into the position shown in FIG. 2. This displacement of the guide roller 9 occurs when the setting carriage 6 is positioned at the extreme left. The setting carriage 6 now travels from the position shown in FIG. 1 into the position shown in FIG. 2. The wire 15 is thereby drawn over the guide roller 9 and is tensioned horizontally. The horizontal section extends from the guide roller 9 to the guide rollers 16, 17 of the setting carriage 6. The setting carriage is situated in a position such that the egress aperture between the guide rollers 16, 17 lies approximately in the plane of the left-hand flange 18 of the reel 2.

Figure 3:
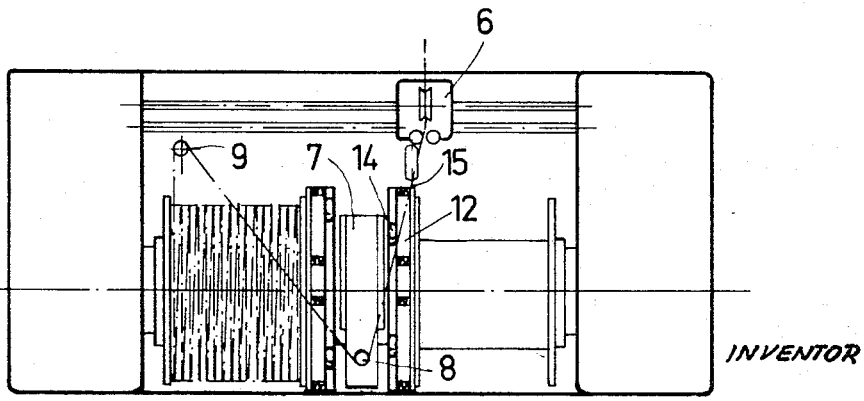

The swivelling arm 7 is now moved from the position according to FIGS. 1 and 2 into the position according to FIG. 3. Since the wire comes into the path of travel of the swivelling arm 7 during horizontal tensioning, it is entrained in the swivelling motion of the same. The wire is tensioned thereby between the recuperator roller 8 and the setting carriage, transversely across the periphery of the catching plate 12. The roller 9 is then lowered and the wire reaches the position according to FIG. 4, in which it is grasped by the catchers of both plates after slipping off the recuperator roller. The wire thereupon is laid firmly on the periphery of the catching plate 12, being wedged between the turns of the coil springs 13. The piece of wire held fast between the catching plates 11 and 12 is carried against a stationary cutter, not shown, which severs the wire. The wire start for the reel 2 is now securely held fast during winding on the periphery of the catching plate 12 by means of the springs 13. Whirling away of the wire extremity owing to centrifugal force is not possible.

Details of the construction of the catching plates 11, 12 are illustrated in FIGS. 5 and 6. Separated teeth 19 are provided on one rim of the cylindrically formed catching plate, whereas on the other side of the catching plate their is a continuous raise drim 20. The gaps 21 between the teeth allow passage of the wire from the catching plate to the reel. The teeth 19 are rounded off at 28 and 29, so that the wire cannot be tensioned over sharp edges and thus be damaged. The springs 13 are located between the teeth 19 and the rim 20 and are passed over pins 22 which are secured in the teeth 19 and the rim 20. Several catchers 14 are situated on the rim 20. As shown in FIG. 6, each catcher comprises a lower portion 23 and an upper portion 24. The two portions are secured on the rim 20 by screws 25. The portions 23, 24 of the catcher are so formed that on being assembled they form a mouth 26 which catches the wire. The wire is wedged fast in the constricted rearward portion 27 of the mouth. Each catcher 14 is curved away, FIG. 5, from the clamping springs 13 co-operating therewith towards the edge of the catching plate remote from the reel with which the plate is rotatable and, as can be seen from FIG. 5, the curved portion 14' comes to a point 14" at the edge of the catching plate. The catching or interception point is thereby set outwards as far as possible, that is the wire is gripped by the catchers 14 as early as possible.

Details of the system for the swivelling of the guide rollers 9 and of the recuperator roller 8 are illustrated in FIGS. 7 and 8. The setting carriage is constructed as a double carriage consisting of a main carriage 30 which slides on the guides 5 and supports further guides 31 for a carriage 32. During the winding-on operation, only the main carriage 30 performs a reciprocating motion, whereas the carriage 32 remains at rest relative to the main carriage 30. An upper roller 33 and a lower roller 34 are mounted on the carriage 32, and the wire 15 runs first round roller 33 and then round roller 34.

Two recuperator rollers 8 (see FIG. 8) are provided on the swivelling arm 70 to ensure that the wire is guided into the closest possible proximity to the catchers. The swivelling arm 7 is mounted on a carriage 44 displaceable lengthwise of rails 43. A hydraulic cylinder 35, which is pivotally mounted at 36 on the machine frame and whose piston rod 37 is connected to the swivelling arm 7, is arranged to effect displacement of the carriage 34 and swivelling of the arm 7. In the idle position, the carriage 44 is situated at the right-hand extremity, FIG. 7, of the rail 43; the swivelling arm 7 stands at right angles (shown in broken lines, FIG. 7). During movement from the idle position, the arm 7 initially remains at right angles owing to the pulling action of the wire 15 and to the action of a tension spring 38. When the carraige 34 has travelled to reach a stop at the left-hand extremity, FIG. 7, of the rail 33, the swivelling arm is then swivelled towards the left, that is counter-clockwise, against the tension of the wire 15 and against the pull of the spring 38.

A hydraulic cylinder 39 has a piston rod 40 which acts on a supporting element 42 for the guide rollers 9, 10, the element 42 being pivoted at 41 and serving the purpose of displacing the guide rollers 9, 10. The position shown in full lines, FIG. 7, is the deflected position in which the wire 15 is grasped and the idle position is shown in broken lines 9'.

The active position of the recuperator roller 8, that is the full line position thereof, FIG. 7, is such that after lowering of the guide rollers 9, 10 and the lessening of wire tension connected therewith, the wire slips inwards on and along the recuperator roller and is then grasped by the catchers.

I claim:

1. Winding apparatus for the continuous winding of drawn stock, particularly wire, on to a reel, comprising a pair of reels supported in spaced relation for rotation about an axis common thereto, a catching plate rotatable with each reel, at least one catching device mounted on the periphery of each catching plate for movement therewith, clamping means in the form of a coil spring co-operating with each catching device to retain stock in engagement with the catching device, and a stock-laying carriage supported for movement in a path parallel to the axis of rotation of the reels and including means operable to guide stock on to a catching plate for engagement by a catching device and a co-operating clamping means mounted thereon and which guide the stock on to the reel with which the catching plate is associated.

2. Winding apparatus for the continuous winding of drawn stock, particularly wire, on to a reel, comprising a pair of reels supported in spaced relation for rotation about an axis common thereto, a catching plate rotatable with each reel and having a tooth and a rim thereon, at least one catching device mounted on the periphery of each catching plate for movement therewith, coil springs co-operating with each catching device to retain stock in engagement with the catching device, each coil spring being mounted between the tooth and the rim on each catching plate, and a stock-laying carriage supported for movement in a path parallel to the axis of rotation of the reels and including means operable to guide stock on to a catching plate for engagement by the tooth and between windings of the coil spring mounted thereon and which guide the stock on to the reel with which the catching plate is associated.

3. Winding apparatus according to claim 2, wherein the pitch of the turns of the coil springs is approximately parallel to the direction of the stock passing from said carriage to the catching plate.

4. Winding apparatus according to claim 1, including for each reel a guide roller supported by said carriage for swinging movement towards and away from the reel appropriate thereto, said rollers being operable to tension stock passing from the carriage to the reels, and a swivelling arm located between the reels and supporting at least one recuperator roller movable by said arm between an idle position thereof at which it is engageable with stock tensioned between said guide rollers and an operative position at which the stock is moved thereby to a position in the region of engagement of the stock by a catching device.

5. Winding apparatus according to claim 2, including for each reel a guide roller supported by said carriage for swinging movement towards and away from the reel appropriate thereto, said rollers being operable to tension stock passing from the carriage to the reels, and a swivelling arm located between the reels and supporting at least one recuperator roller movable by said arm between an idle position thereof at which it is engageable with stock tensioned between said guide rollers and an operative position at which the stock is moved thereby to a position in the region of engagement of the stock by a catching device.

6. Winding apparatus according to claim 1, wherein each catching device is curved away from the clamping means co-operating therewith towards the edge of the catching plate remote from the reel with which the catching plate is rotatable, and the curved portion comes to a point at said edge.

7. Winding apparatus according to claim 1, including for each reel a guide roller supported by said carriage for swinging movement towards and away from the reel appropriate thereto, said rollers being operable to tension stock passing from the carriage to the reels, and a swivelling arm located between the reels and supporting at least one recuperator roller movable by said arm between an idle position thereof at which it is engageable with stock tensioned between said guide rollers and an operative position at which the stock is moved thereby to a position in the region of engagement of the stock by a catching device.

8. Winding apparatus according to claim 2, wherein each catching device is curved away from the coil spring cooperating therewith towards the edge of the catching plate remote from the reel with which the catching plate is rotatable, and the curved portion comes to a point at said edge.

9. Winding apparatus according to claim 2, including for each reel a guide roller supported by said carriage for swinging movement towards and away from the reel appropriate thereto, said rollers being operable to tension stock passing from the carriage to the reels, and a swivelling arm located between the reels and supporting at least one recuperator roller movable by said arm between an idle position thereof at which it is engageable with stock tensioned between said guide rollers and an operative position at which the stock is moved thereby to a position in the region of engagement of the stock by a catching device.

References Cited
UNITED STATES PATENTS

| | | | |
|---|---|---|---|
| 2,735,629 | 2/1956 | Hicks et al. | 242—25 |
| 2,946,527 | 7/1960 | Ellis | 242—25 |

FRANK J. COHEN, *Primary Examiner.*

N. L. MINTZ, *Assistant Examiner.*